Patented Oct. 11, 1932

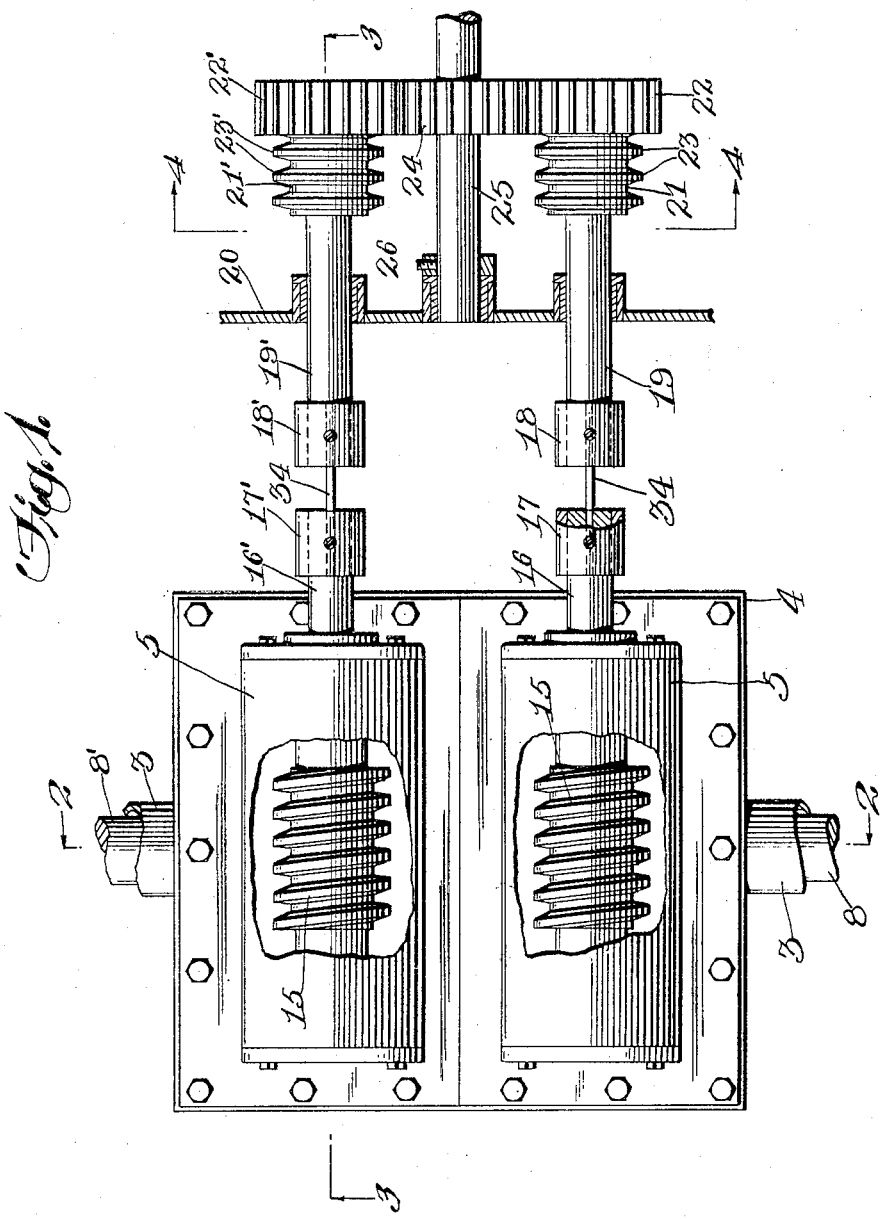

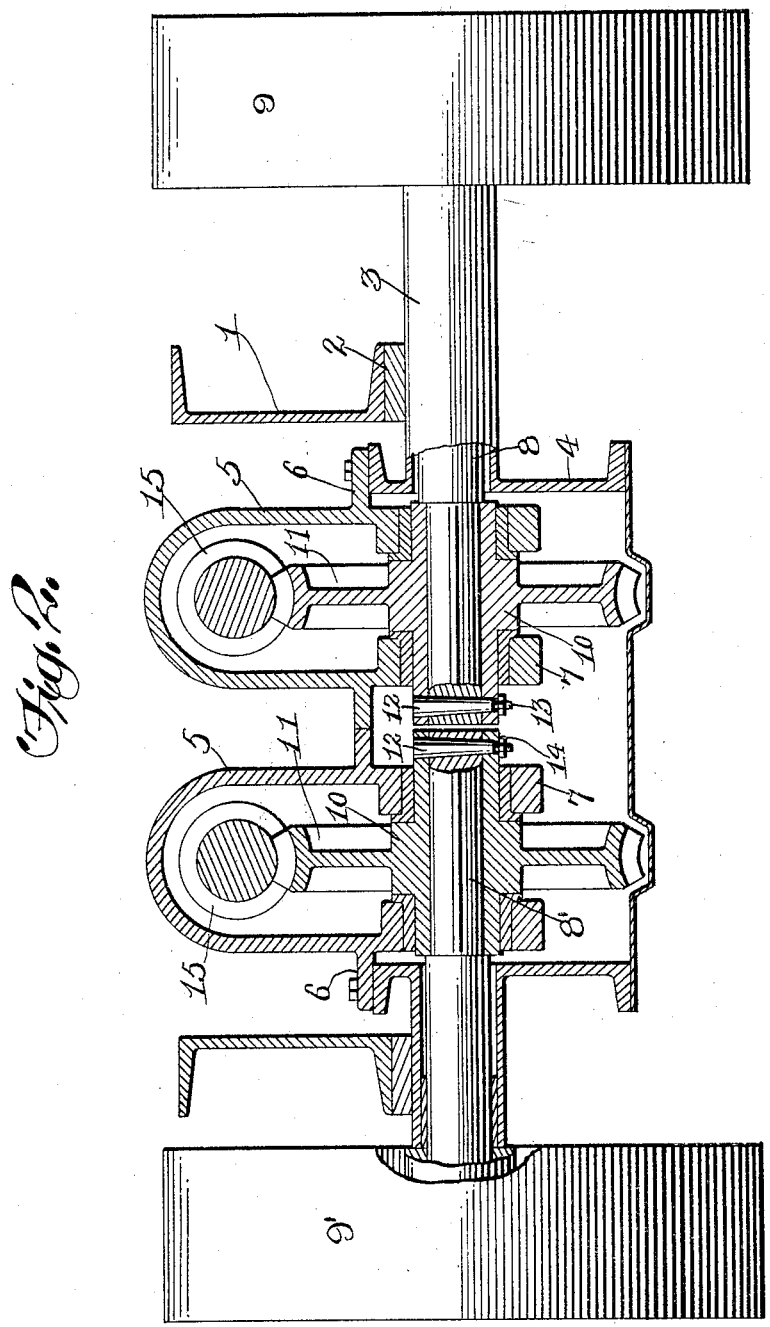

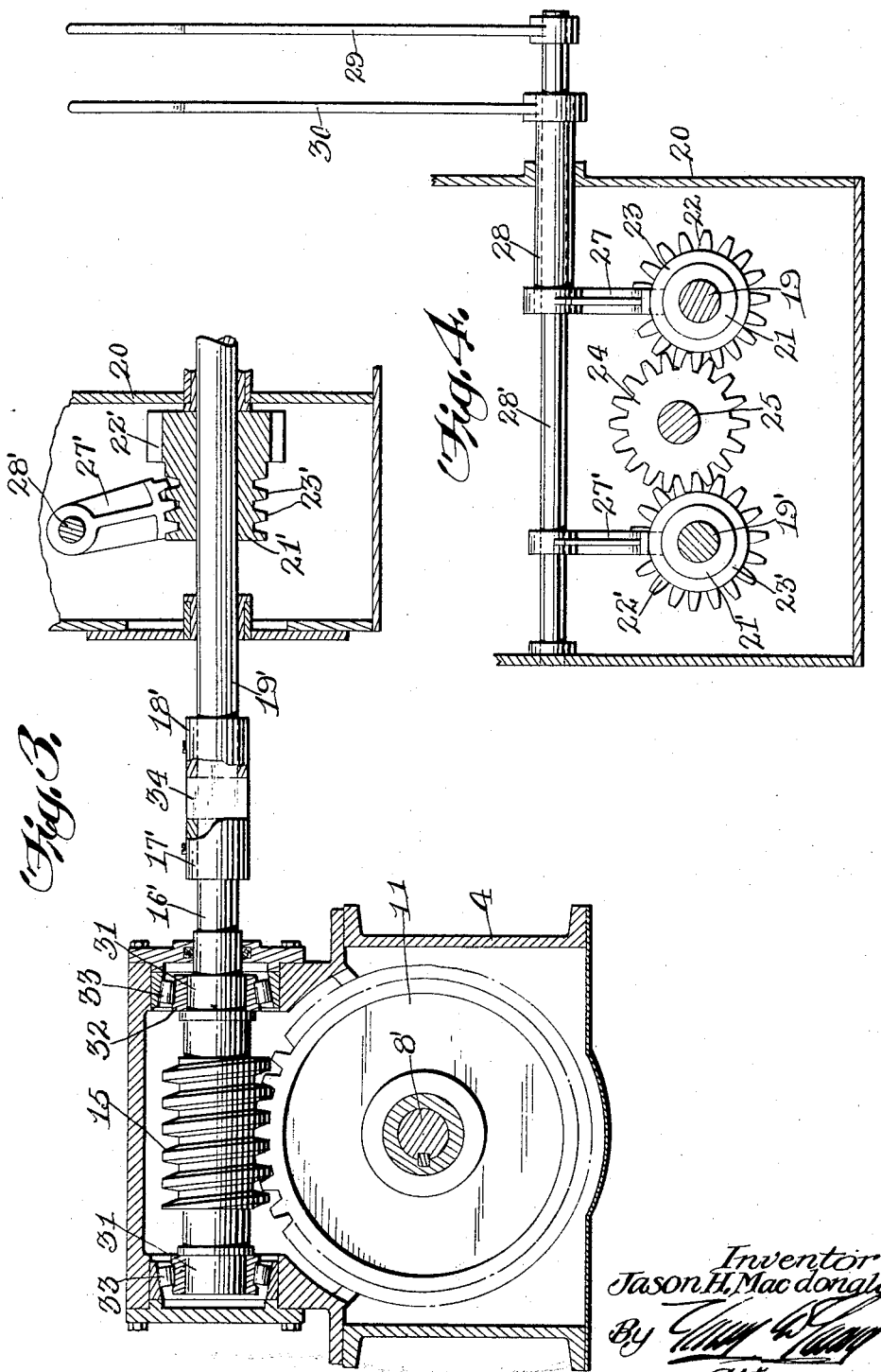

1,882,367

UNITED STATES PATENT OFFICE

JASON H. MACDONALD, OF MILWAUKEE, WISCONSIN, ASSIGNOR TO C. H. & E. MANUFACTURING COMPANY, INC., OF MILWAUKEE, WISCONSIN

STEERING APPARATUS

Application filed February 14, 1930. Serial No. 428,423.

This invention relates to new and useful improvements in steering apparatus and more particularly to a steering apparatus which is especially adapted for use on endless tractors.

One of the objects of my invention is the provision of combined driving and steering apparatus for tractors wherein the steering of the tractor can be accomplished through the medium of the driving mechanism, and whereby the operator can readily control the movement of the tractor so that the tractor can be driven straight ahead or turned to either side at the will of the operator.

Another object of my invention is the provision of a combined driving and steering device wherein the driving and steering wheels are located upon separate and independent axles, each axle having direct driving and steering connection to a single driven shaft with movable means forming connection between the independent axles and the driving shaft whereby the two driving and steering axles may be driven simultaneously or independent in accordance with the desire of the operator.

A further object of the invention is the provision of new and improved means for driving connection to the driving axles of a tractor, whereby the driving axles are utilized for steering the tractor and whereby either one of the driving axles may be operated independently of the other or both operated simultaneously, together with means whereby the operator of the tractor can readily control the movement of the tractor so that the same can be steered straight ahead or turned in either direction.

With the above and other objects in view, the invention consists in the novel features of construction, the combination and arrangement of parts hereinafter more fully set forth, pointed out in the claims and shown in the accompanying drawings wherein:

Figure 1 is a top plan view illustrating the operative connection between the main drive shaft and the two traction axles;

Figure 2 is a transverse sectional view on the line 2—2 of Figure 1;

Figure 3 is a longitudinal section on the line 3—3 of Figure 1; and,

Figure 4 is a transverse section on the line 4—4 of Figure 1.

The present invention is particularly adapted for endless tractors, wherein the front driving and steering axle is formed of two separable parts, each operated independent of the other whereby these parts may be driven simultaneously or independently for steering the tractor.

Referring more particularly to the drawings, 1 indicates the side U beams of the frame of a tractor, carrying suitable bearings 2 supporting sleeve housings 3 and a main housing 4.

Arranged above the main housing 4 are the hoods 5 having laterally disposed flanges 6 which rest upon similar flanges on the housing 4 and are bolted thereto. The hoods 5 have depending bearings 7 which extend into the housing 4 and support the inner ends of the two drive axles 8 and 8'. The drive axles 8 and 8' extend outwardly through the housings 3 and have mounted upon their outer ends the traction and steering wheels 9 and 9'. It will be noted that the inner ends of the axles are somewhat reduced and keyed thereto are the hubs 10 on the worm gears 11. The hubs 10 of the worm gears 11 have laterally projecting sleeve portions, the innermost of which extend to the inner ends of the reduced portions of the axles, and are secured to the axles by means of the transverse pins 12 which project through the sleeves and through the axles with threaded ends 13 having nuts 14 thereon to retain the pins in position. These pins 12 are preferably tapered toward the threaded portion so that when the nuts 14 are screwed tightly in position, these pins will be securely held against displacement.

In the operation of the device, it is preferred to have the housing 4 filled with a suitable lubricant through which the worm gears 11 move and these worm gears mesh with suitable worms 15 on the parallel shaft sections 16 and 16'. The shaft sections 16 and 16' project into the hoods 5 and have at their outer ends suitable coupling members 17 and 17' adapted to be flexibly connected to coupling members 18 and 18' on the shaft sections 19 and 19'.

The shaft sections 19 and 19' extend into a housing 20 and mounted upon their inner ends are the sleeves 21 and 21', said sleeves carrying pinions 22 and 22' and also carry the still threads 23 and 23'.

The pinions 22 and 22' are adapted to engage with a pinion 24 on the drive shaft 25, the inner end of which is mounted in a suitable bearing 86 in one side of the housing 20. The shaft 25 may be driven from any source of power carried by the tractor and when both of the pinions 22 and 22', are in engagement with the pinion 24, both axles 8 and 8' will be driven simultaneously so that the tractor can be driven straight ahead.

The sleeves 21 and 21' are preferably keyed upon the shaft sections 19 and 19' so that these sleeves will slide longitudinally upon these shaft sections and cooperating with the still threads 23 and 23' are the toothed sectors 27 and 27', sector 27' being keyed to a shaft 28' which extends transversely of the housing 20, while sector 27 is secured to the inner end of the rotatable sleeve 28, mounted on shaft 28'. The shaft 28' extends beyond the outer end of sleeve 28 and carries a hand lever 29, while sleeve 28 has attached to its outer end a hand lever 30, whereby the sleeve 28 and shaft 28' can be rotated simultaneously or independently as the case may require.

In mounting the shaft sections 16 and 16', which carry the worms 15 in the hoods 5, it will be noted that each of these shaft sections carries spaced bearing parts 31, these bearing parts have thereon collars 32 rotatable within the roller bearings 33, this structure mounting the worms 15 so that they will rotate at comparative ease and assist in driving the tractor with a minimum amount of power.

Extending between the coupling members 17 and 18, and between the coupling members 17' and 18' are the links 34 which are so connected to the coupling members as to form a flexible connection between shaft sections 16 and 19 and 16' and 19'. This structure permits the shaft sections and their cooperative parts to be assembled in their respective housings and then connected together.

From the foregoing description, it will be readily apparent that the operation of my improved combined driving and steering mechanism can be actuated as follows. When it is desired to drive the tractor straight ahead, both of the pinions 22 and 22' will be meshing with pinion 24. However, should it be desired to turn the tractor either to the right or to the left, one of the pinions 22 or 22' will be moved forwardly and be disengaged from the pinion 24, thus permitting one of the axle sections to remain idle while the other is in motion.

For example, if pinion 22' is moved forwardly out of engagement with the pinion 24 through the actuation of lever 29, this will permit the axle section 8' to remain idle, while axle section 8 will be driving forwardly, causing the tractor to turn with the wheel 9' as a pivot and driving the tractor toward the right. If it is desired to turn to the left, a reverse operation may be carried out by actuating lever 30, disengaging pinion 22 from pinion 24 and drive axle 8' while axle 8 is stationary.

It will be apparent that by using the connection which includes the worm gears 11 and worms 15 that this connection takes the place of clutches and brakes, as the friction between the worms and worm gears will act as a brake when the power to shaft 25 is cut off, thus almost immediately stopping the traction machine as soon as the power is cut off.

From this, it will be apparent that I have provided simple and inexpensive means whereby the drive mechanism of a tractor can be utilized for steering the tractor by forming the driving axle of two separable sections so that they may be driven either simultaneously or independently.

While I have shown and described the preferred embodiment of my invention, it will be apparent that slight changes may be made in the construction when putting the invention into practice without departing from the spirit of the same or the scope of the appended claims.

I claim:

1. A device of the class described including aligned traction axles, spaced shafts traversing the traction axles, means forming operative connection between the spaced shafts and the traction axles, sleeves on the inner ends of said spaced shafts, pinions on said sleeves, a power shaft extending between the first shafts, a pinion on the power shaft cooperating with the pinions on the first shafts, annular ribs on said sleeves and manually controlled means cooperating with said ribs whereby to move the pinions on the spaced shafts longitudinally thereof for simultaneously engaging said pinions with the pinion on the power shaft or independently engaging either one of the first pinions with the pinion on the power shaft.

2. A device of the class described including aligned traction axles, a pair of spaced shafts, means forming operative connection between the shafts and the traction axles, a power shaft extending between said spaced shafts, sleeves on the spaced shafts, pinions on the sleeves, a pinion on the power shaft cooperating with the first pinions, annular ribs on the sleeves, an operating shaft traversing the spaced shafts, a toothed segment carried by the operating shaft and engaging the ribs on one sleeve, a rotatable sleeve on the operating shaft, a toothed segment carried thereby and engaging the ribs on the other sleeve, and manually controlled levers carried by the operating shaft and sleeve thereon for imparting movement to said segments for moving the sleeves longitudinally on the spaced shafts whereby to simultaneously engage the pinions carried by the sleeves with the pinion on the power shaft or independently engaging one of said first pinions in the pinion on the power shaft, thereby imparting a simultaneous or independent movement to the traction axles.

3. A device of the character described including opposed drive axles, worm gears carried thereby, spaced shafts traversing the axles, worms carried by the shafts and engaging the worm gears, pinions on said shafts each having a still thread section, a drive pinion for engagement with the first pinions, sectors adapted to cooperate with the still thread sections for moving said pinions into and out of engagement with the drive pinion, and means for manually controlling said sectors.

4. A device of the character described including opposed drive axles, worm gears carried thereby, spaced shafts traversing the axles, worms carried by the shafts and engaging the worm gears, pinions on said shafts each having a still thread section, a drive pinion for engagement with the first pinions, a supporting shaft adjacent said drive pinion, a sector carried thereby and engaging one of the still thread sections, a rotatable sleeve mounted upon the shaft, a sector carried by the sleeve and engaging the other still thread section and means for manually rotating said supporting shaft and sleeve to actuate the sectors for moving the pinions into and out of engagement with the drive pinion.

5. A steering and driving apparatus comprising a pair of aligned drive axles having their inner ends terminating in close relation a pair of spaced parallel driven shafts arranged at right angles to the drive axles and terminating adjacent to the same, a worm wheel driving connection between each shaft and each axle, the worm wheels being carried by the axles, whereby the axles will be normally held against movement by the worms, a drive shaft extending between the driven shafts, a spur gear on the drive shaft, spur gears feathered on the driven shafts, and means for independently operating the last mentioned spur gears into and out of engagement with the first mentioned spur gear.

In testimony that I claim the foregoing I have hereunto set my hand at Milwaukee, in the county of Milwaukee and State of Wisconsin.

JASON H. MACDONALD.